Patented Aug. 20, 1929.

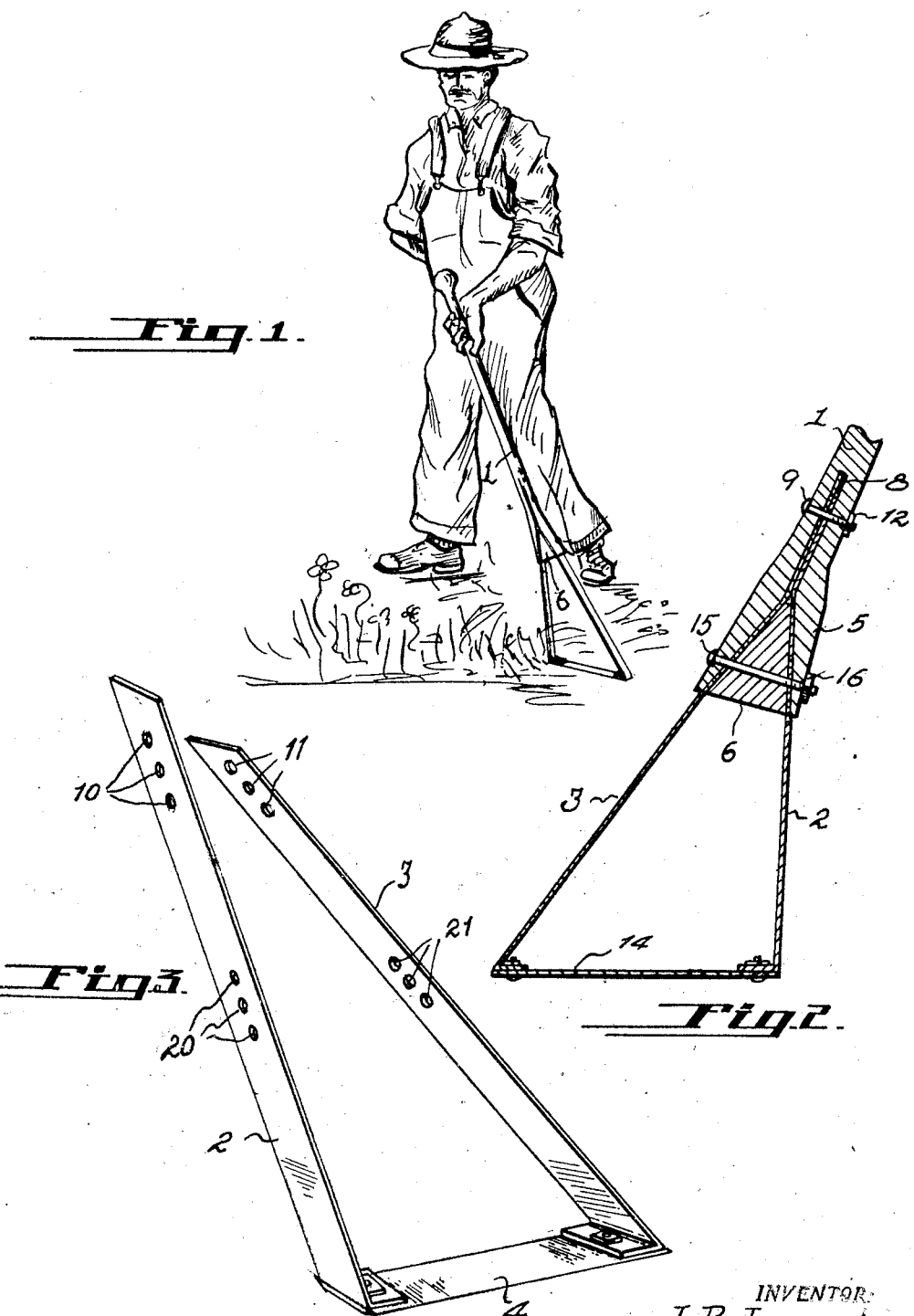

1,725,655

UNITED STATES PATENT OFFICE.

JONES R. LEARD, OF HARTWELL, GEORGIA.

LAWN MOWER AND WEED CUTTER.

Application filed March 13, 1929. Serial No. 346,671.

This invention relates to what I term a lawn mower and weed cutter and has for its object to so construct the apparatus as to prolong its life and make it adjustable to suit users of different heights. Heretofore devices of the character shown for example in the patent of Levine, 913,525, February 23, 1909, could only be conveniently used by a person of given height. Furthermore, the support for the cutters from constant bending soon broke and the cutters were of short duration.

By rearranging my cutter so as to include supporting bars and transferring the strains and by making the cutter adjustable I have overcome many of the difficulties encountered in using cutters previously in use.

With this and other objects in view which will be apparent as the description proceeds, I will now describe my invention in connection with the drawings in which—

Figure 1 is a perspective view showing the manner in which my cutter is held by a user.

Figure 2 is a section through the cutter and

Figure 3 is a perspective view of showing the blades and supporting arms.

Referring more particularly to the drawings, 1 represents the handle of the machine and 2 and 3 are bars having considerable width as shown to withstand the sidewise strains to which the device is subjected when in use. 4 is the cutting blade which may be fastened to the arms 2 and 3 as by bolts and nuts.

The handle 1 is considerably enlarged at 5 and a block 6 is sawed out of the handle and a groove 8 is extended upwardly into the handle and is sufficiently wide to accommodate the upper ends of both bars 2 and 3. After the bars 2 and 3 have been inserted in the groove 8 and adjusted relatively to each other so as to incline the blade 4 to suit the height of the user of the cutter a bolt 9 is inserted in a desired one of the holes 10 and the bar 2 is adjusted back and forth to bring into registry a desired one of the holes 11 in the bar 2 and the bolt 9 passed therethrough and is held by a nut 12. The block 6 is then inserted between the bars 2 and 3 and a bolt 15 passed through the handle and block 6 and is held in place by a nut 16. The holes 10 and 11 must be located relatively to each other so that after the bolt 9 is passed through one of the holes 10 and one of the holes 11 the bolt 15 will always find one of the holes 20 in the bar 2 and a corresponding hole 21 in the bar 3.

By having the bars 2 and 3 sufficiently broad they will resist any ordinary sidewise strain and by adjusting the bars 2 and 3 relatively to each other in the handle as above described, the cutting blade 4 may be inclined at any desired angle to suit the height of the user.

What I claim as new is:

A weed cutter comprising a blade, bars attached to each end of the blade, each bar having two series of holes therein, a handle having a V-shaped opening at its lower end with an extension groove extending from the apex of the opening up the handle to accommodate both bars, a V-shaped block to snugly fit between the bars when passed through the V-shaped opening in the handle and bolts adapted to pass through holes in the handle and a hole in each of the series of holes in the bars whereby the bars may be adjusted in the groove relatively to each other to change the angle of the cutting blade relatively to the axis of the handle.

In testimony whereof I affix my signature.

JONES R. LEARD.